(12) United States Patent
Mizuno et al.

(10) Patent No.: US 10,967,859 B2
(45) Date of Patent: Apr. 6, 2021

(54) VEHICLE CONTROL APPARATUS AND VEHICLE CONTROL METHOD

(71) Applicant: HONDA MOTOR CO., LTD., Tokyo (JP)

(72) Inventors: Toshiyuki Mizuno, Wako (JP); Takayuki Kishi, Wako (JP); Yoshiaki Konishi, Wako (JP); Makoto Kurihara, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 295 days.

(21) Appl. No.: 16/292,493

(22) Filed: Mar. 5, 2019

(65) Prior Publication Data

US 2019/0291734 A1 Sep. 26, 2019

(30) Foreign Application Priority Data

Mar. 20, 2018 (JP) .............................. JP2018-053101

(51) Int. Cl.
*B60W 30/14* (2006.01)
*B60L 7/10* (2006.01)

(52) U.S. Cl.
CPC ............. *B60W 30/146* (2013.01); *B60L 7/10* (2013.01); *B60W 2510/1005* (2013.01); *B60W 2510/182* (2013.01); *B60W 2554/804* (2020.02); *B60W 2556/65* (2020.02); *B60W 2710/18* (2013.01)

(58) Field of Classification Search
CPC ......... B60W 30/146; B60W 2554/804; B60W 2556/65; B60W 2510/1005; B60W 2510/182; B60W 2710/18; B60L 7/10
See application file for complete search history.

(56) References Cited

U.S. PATENT DOCUMENTS

| 8,417,860 B2* | 4/2013 | Choi ....................... H04L 67/12 |
| | | 710/100 |
| 9,616,743 B1* | 4/2017 | Mays ..................... B60W 10/30 |
| 10,922,979 B2* | 2/2021 | Reimann .............. G05D 1/0293 |
| 2007/0030212 A1* | 2/2007 | Shibata .................. G08G 1/162 |
| | | 345/9 |

(Continued)

FOREIGN PATENT DOCUMENTS

JP H10-105880 A 4/1998

*Primary Examiner* — Hussein Elchanti

(74) *Attorney, Agent, or Firm* — Thomas Horstemeyer, LLP

(57) ABSTRACT

A vehicle control apparatus controls a vehicle that is performing automated driving traveling. The vehicle control apparatus comprises: a communication unit configured to acquire deceleration information of another vehicle by communication with the other vehicle; a setting unit configured to set, for a deceleration of the vehicle, a range of an allowable deceleration that allows a vehicle speed change within a predetermined range; a determination unit configured to compare the deceleration of the vehicle with a deceleration included in the deceleration information and determine whether deceleration control of matching the deceleration of the vehicle with the deceleration of the other vehicle can be performed within the range of the allowable deceleration; and a control unit configured to perform the deceleration control of the vehicle based on a determination result of the determination unit.

13 Claims, 10 Drawing Sheets

(56) References Cited

U.S. PATENT DOCUMENTS

| | | | |
|---|---|---|---|
| 2008/0167774 A1* | 7/2008 | Patel | G08G 1/20 |
| | | | 701/36 |
| 2014/0236414 A1* | 8/2014 | Droz | G08G 1/166 |
| | | | 701/28 |
| 2017/0036601 A1* | 2/2017 | Kimura | B60R 1/00 |
| 2017/0122841 A1* | 5/2017 | Dudar | B60W 40/02 |
| 2018/0137763 A1* | 5/2018 | Derag Rden | B60W 10/18 |
| 2019/0196501 A1* | 6/2019 | Lesher | B60T 7/22 |
| 2020/0267519 A1* | 8/2020 | Reimann | G08G 1/096791 |
| 2020/0365031 A1* | 11/2020 | Zheng | G08G 1/163 |
| 2020/0410868 A1* | 12/2020 | Bouillon | G05D 1/0293 |

* cited by examiner

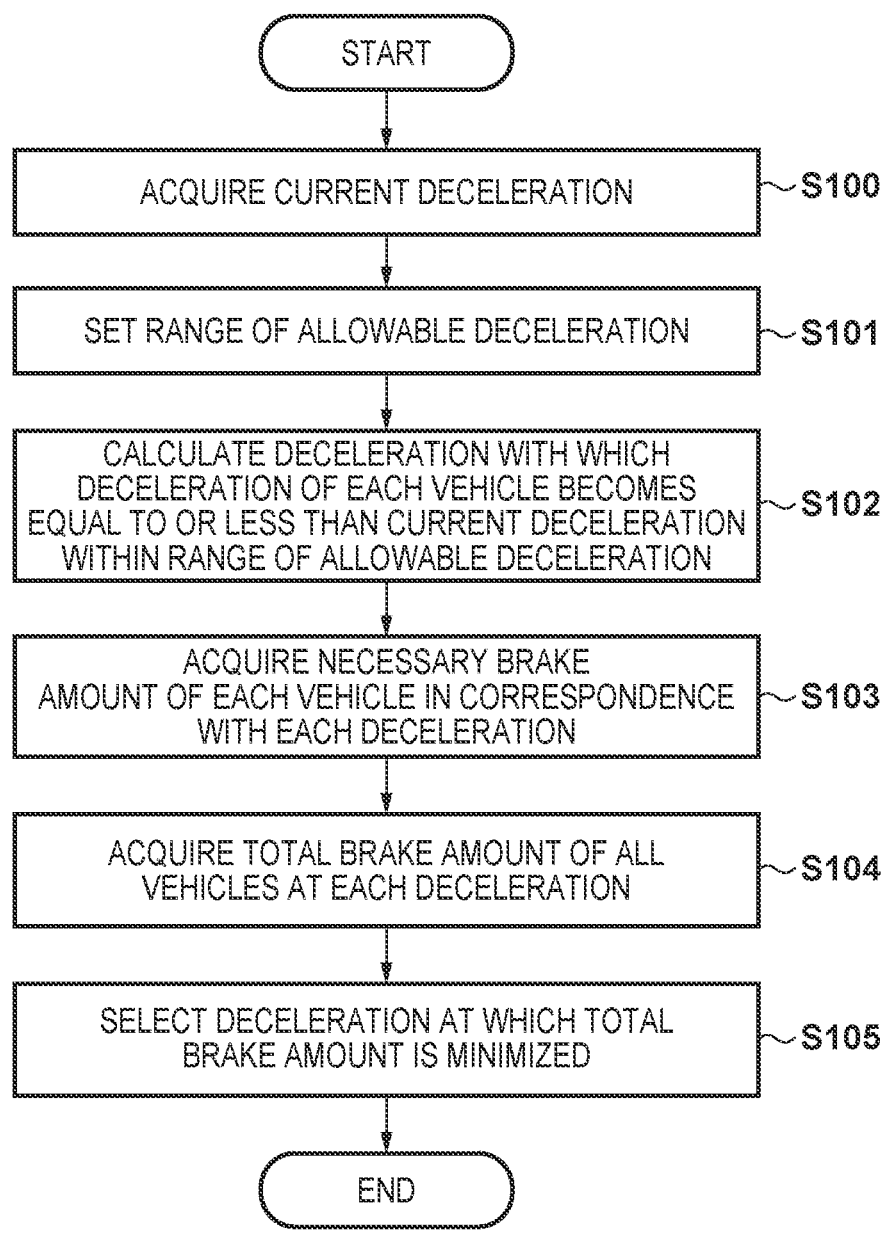

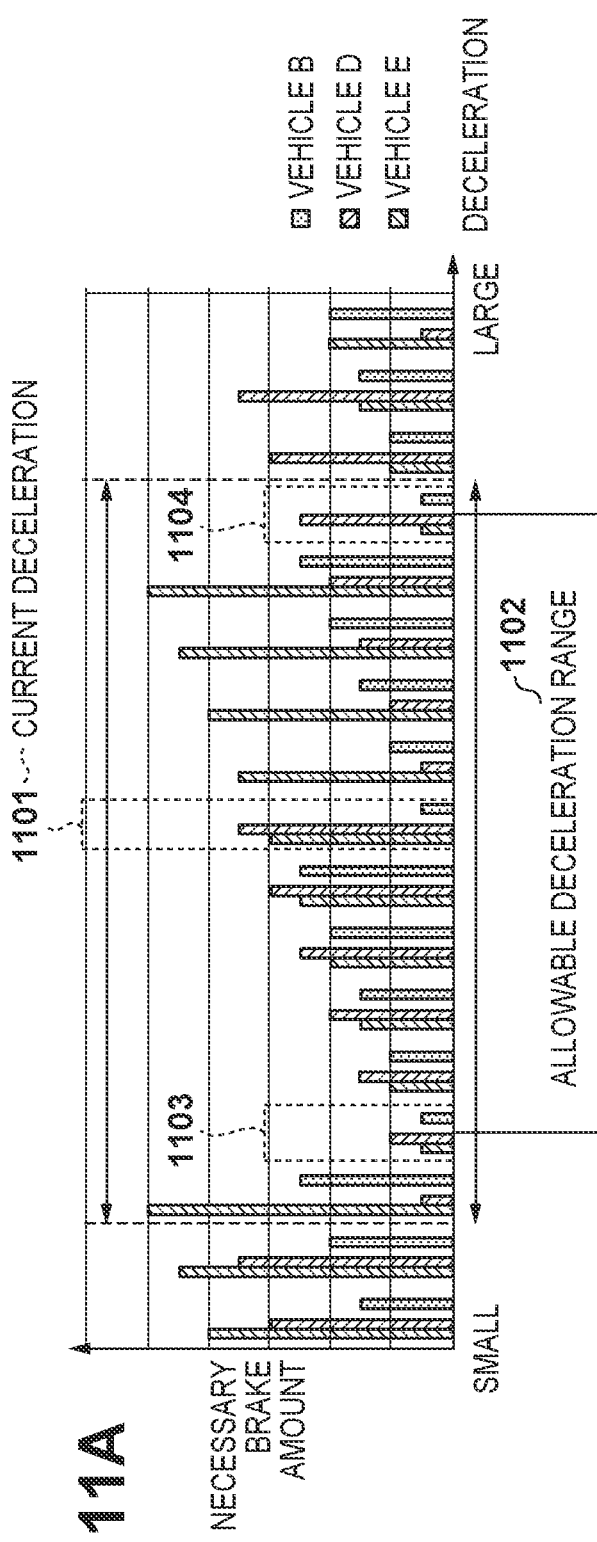
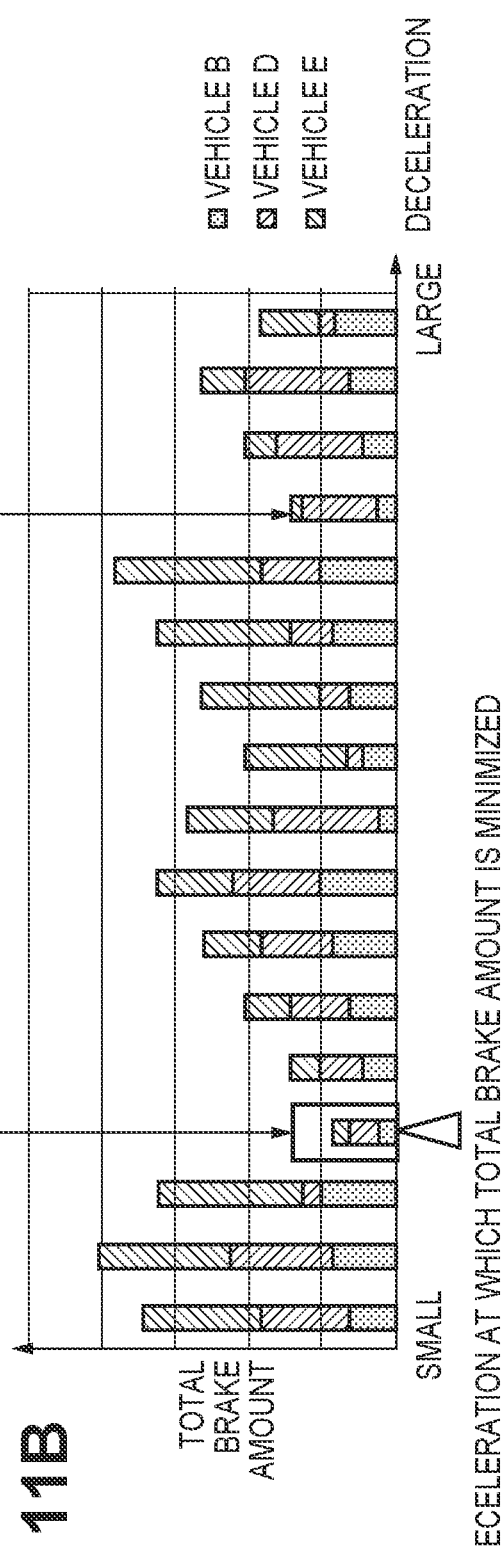

VEHICLE CONTROL APPARATUS AND VEHICLE CONTROL METHOD

CROSS-REFERENCE TO RELATED APPLICATION(S)

This application claims priority to and the benefit of Japanese Patent Application No. 2018-053101 filed on Mar. 20, 2018, the entire disclosure of which is incorporated herein by reference.

BACKGROUND OF THE INVENTION

Field of the Invention

The present invention relates to a vehicle control apparatus and a vehicle control method.

Description of the Related Art

Japanese Patent Laid-Open No. 10-105880 discloses an arrangement in which a moving body control system that performs communication via two paths, that is, vehicle-to-vehicle communication and vehicle-to-infrastructure communication controls traveling of a plurality of vehicles.

However, even if the ratio is the same, the gear ratio of the final deceleration gear changes between the vehicles. For this reason, in the arrangement of Japanese Patent Laid-Open No. 10-105880, when the vehicles perform deceleration travel on a downhill with the same following distance and the same ratio, the following vehicle may be too close to the preceding vehicle or may be too far apart from the preceding vehicle. For example, in a case in which the traveling speed of the following vehicle can hardly match the traveling speed of the preceding vehicle, acceleration may be performed too much with the currently set ratio, and a braking operation may be needed. If the ratio is lowered by one step, the deceleration may be too large, and an acceleration operation may be needed. That is, it may be difficult to execute deceleration control with deceleration matching between the vehicles that travel by automated driving.

The present invention has been made in consideration of the above-described problem, and provides a vehicle control technique capable of setting a cooperative deceleration matching the deceleration of another vehicle based on deceleration information acquired by communication with the other vehicle and performing deceleration control based on the cooperative deceleration.

SUMMARY OF THE INVENTION

According to one aspect of the present invention, there is provided a vehicle control apparatus for controlling a vehicle that is performing automated driving traveling, comprising: a communication unit configured to acquire deceleration information of another vehicle by communication with the other vehicle; a setting unit configured to set, for a deceleration of the vehicle, a range of an allowable deceleration that allows a vehicle speed change within a predetermined range; a determination unit configured to compare the deceleration of the vehicle with a deceleration included in the deceleration information and determine whether deceleration control of matching the deceleration of the vehicle with the deceleration of the other vehicle can be performed within the range of the allowable deceleration; and a control unit configured to perform the deceleration control of the vehicle based on a determination result of the determination unit, wherein the control unit sets a deceleration matching between the vehicle and the other vehicle as a cooperative deceleration and performs the deceleration control of the vehicle based on the cooperative deceleration, and the communication unit transmits a signal including information of the cooperative deceleration to the other vehicle.

According to the present invention, it is possible to set a cooperative deceleration matching the deceleration of another vehicle based on deceleration information acquired by communication with the other vehicle and perform deceleration control based on the cooperative deceleration.

BRIEF DESCRIPTION OF THE DRAWINGS

FIG. 10 is a flowchart for explaining the procedure of selection processing in a case in which a plurality of cooperative deceleration candidates exist; and FIGS. 11A and 11B are views for explaining selection processing in a case in which a plurality of cooperative deceleration candidates exist.

DESCRIPTION OF THE EMBODIMENTS

The embodiment of the present invention will now be described with reference to the accompanying drawings. The constituent elements described in this embodiment are merely examples, and are not limited by the following embodiment.

(Arrangement of Vehicle Control Apparatus)

Figure 1:
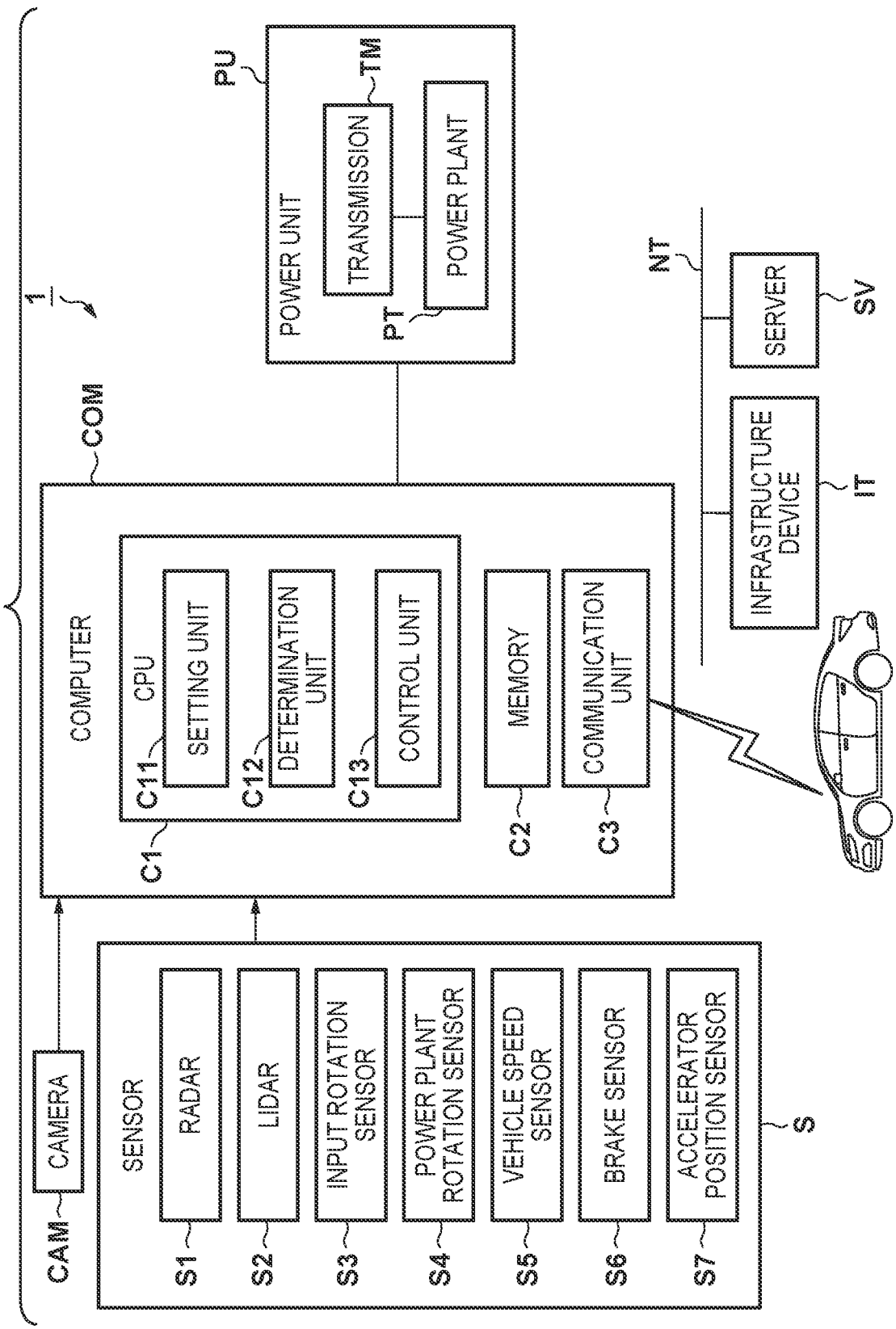
FIG. 1 is a view exemplarily showing the basic arrangement of a vehicle.

A vehicle according to this embodiment is a vehicle capable of traveling by automated driving. FIG. 1 is a view exemplarily showing the basic arrangement of a vehicle 1. The vehicle 1 includes a sensor S, a camera CAM, and a computer COM (ECU). The sensor S includes, for example, a radar S1, a lidar (Light Detection and Ranging) S2, an input rotation sensor S3, a power plant rotation sensor S4, a vehicle speed sensor S5, a brake sensor S6, and an accelerator position sensor S7. The radar S1, the lidar S2, and the camera CAM acquire the peripheral information of the vehicle 1 (self-vehicle) or the information of a preceding vehicle and input them to the computer COM.

In addition, the computer COM includes a CPU (C1) that controls processing concerning automated driving control of the vehicle 1, a memory C2, and a communication unit C3. The CPU (C1) of the computer COM can control automated driving traveling of the vehicle 1 (self-vehicle) based on the information of the preceding vehicle or the peripheral information of the vehicle 1, which is input from the sensor S (the radar S1 and the lidar S2) and the camera CAM. When the vehicle 1 includes a stepped transmission as the arrangement of a transmission TM, the memory C2 stores the information of a deceleration (deceleration information) corresponding to each ratio of the transmission TM.

The communication unit C3 can perform vehicle-to-vehicle communication, and can transmit/receive, by communication, deceleration information to/from a vehicle when performing preceding vehicle following traveling by automated driving. In a case in which the vehicle 1 (self-vehicle) is the preceding vehicle, the communication unit C3 acquires the deceleration information of another vehicle by communication with the other vehicle. In a case in which the vehicle 1 (self-vehicle) is the following vehicle following a preceding vehicle (another vehicle), the communication unit C3 transmits deceleration information in the memory C2 to the preceding vehicle (the other vehicle) as a response to a request signal from the preceding vehicle. The vehicles can share the deceleration information by vehicle-to-vehicle communication.

In addition, the communication unit C3 is configured to be able to connect to a network NT and communicate with a server SV on the network which provides road traffic information or an infrastructure device IT having a communication function. The communication unit C3 can also acquire deceleration information from a peripheral vehicle traveling before or after the vehicle 1 by communication via the network NT.

The computer COM can perform image processing for the information input for the sensor S (the radar S1 and the lidar S2) and the camera CAM and extract a target (object) existing on the periphery of the self-vehicle. The computer COM extracts a target from an image acquired from the sensor S (the radar S1 and the lidar S2) and the camera CAM and analyzes the relative positional relationship between the self-vehicle and the ambient target to determine what kind of target is arranged on the periphery of the self-vehicle. For example, the computer COM can extract, as a target, the preceding vehicle traveling ahead of the self-vehicle and acquire the following distance (actual following distance) between the self-vehicle and the preceding vehicle. In a case in which the self-vehicle follows the preceding vehicle by automated driving and performs deceleration traveling on a downhill, the computer COM sets a cooperative deceleration matching the deceleration of another vehicle based on deceleration information acquired by vehicle-to-vehicle communication of the communication unit C3 and performs deceleration control based on the cooperative deceleration.

The input rotation sensor S3 is a sensor configured to detect the number of rotations (rotation speed) of the input shaft, which is input from a power plant PT to the transmission TM. The power plant rotation sensor S4 is a sensor configured to detect the number of rotations (rotation speed) of the rotating shaft of the power plant PT. In addition, the vehicle speed sensor S5 is a sensor configured to detect the vehicle speed of the vehicle 1. The detection results of the input rotation sensor S3, the power plant rotation sensor S4, and the vehicle speed sensor S5 are input to the computer COM.

The brake sensor S6 detects the stepping amount of a brake pedal by a driver or the presence/absence of a stepping operation, and inputs detected information to the computer COM. The accelerator position sensor S7 detects the stepping amount (accelerator position) of an accelerator pedal by the driver, and inputs detected information to the computer (COM).

The computer (COM) controls a power unit PU configured to drive the vehicle 1. The power unit PU is a mechanism that outputs a driving force for rotating the driving shaft of the vehicle 1, and includes, for example, the power plant PT such as an engine and the transmission TM. In addition, the power unit PU may further include a motor and a battery.

For example, the motor of the power unit PU is a motor generator having the function of an electric motor and the function of a power generator. The motor is electrically connected to the battery and controlled by the computer COM. The rotating shaft of the motor is mechanically connected to the driving wheels of the vehicle 1 via a predetermined gear range of the transmission TM. When functioning as an electric motor, the motor consumes the power of the battery and drives the driving wheels. On the other hand, when functioning as a power generator, the motor performs regenerative power generation using the rotation of the driving wheels and makes a regenerative deceleration torque act on the driving wheels, and also charges the battery.

The vehicle 1 can travel in a manual driving mode based on the operation of the driver or in an automated driving mode by the automated driving function provided in the vehicle 1 by controlling the power plant PT using information from the sensor S and the camera CAM, information acquired by the communication unit C3 by communication, and information calculated by the CPU (C1).

The CPU (C1) of the computer COM executes a vehicle control program stored in the memory C2, thereby functioning as a setting unit C11, a determination unit C12, and a control unit C13.

The setting unit C11 sets, for the deceleration of the vehicle 1, the range of an allowable deceleration that allows a vehicle speed change within a predetermined range. The determination unit C12 compares the deceleration of the vehicle 1 with the deceleration included in the deceleration information of another vehicle and determines whether deceleration control of matching the deceleration of the vehicle 1 with the deceleration of the other vehicle can be performed within the range of the allowable deceleration. The determination unit C12 compares deceleration included in the deceleration information of the vehicle 1 stored in the memory C2 with the deceleration included in the deceleration information acquired from the other vehicle and determines whether deceleration control of matching the deceleration of the vehicle 1 with the deceleration of the other vehicle can be performed within the range of the allowable deceleration.

The control unit C13 performs deceleration control of the vehicle based on the determination result of the determination unit C12. The control unit C13 sets the deceleration that matches between the vehicle 1 and the other vehicle as a cooperative deceleration and performs deceleration control of the vehicle 1 based on the cooperative deceleration. In addition, the communication unit C3 transmits a signal (execution permission signal) including the cooperative deceleration to the other vehicle. The other vehicle performs deceleration control based on the cooperative deceleration included in the execution permission signal. This enables deceleration control using a matching deceleration between the vehicles.

When the computer COM shown in FIG. 1 is mounted in the vehicle 1, the computer COM may be arranged in, for example, the ECU of a recognition processing system or the ECU of an image processing system which performs information from the sensor S or the camera CAM, may be arranged in an ECU that controls the communication unit or an input/output device, or may be arranged in an ECU in a control unit configured to perform driving control of the vehicle, an ECU configured to control a brake device, or an ECU for automated driving.

Figure 2:
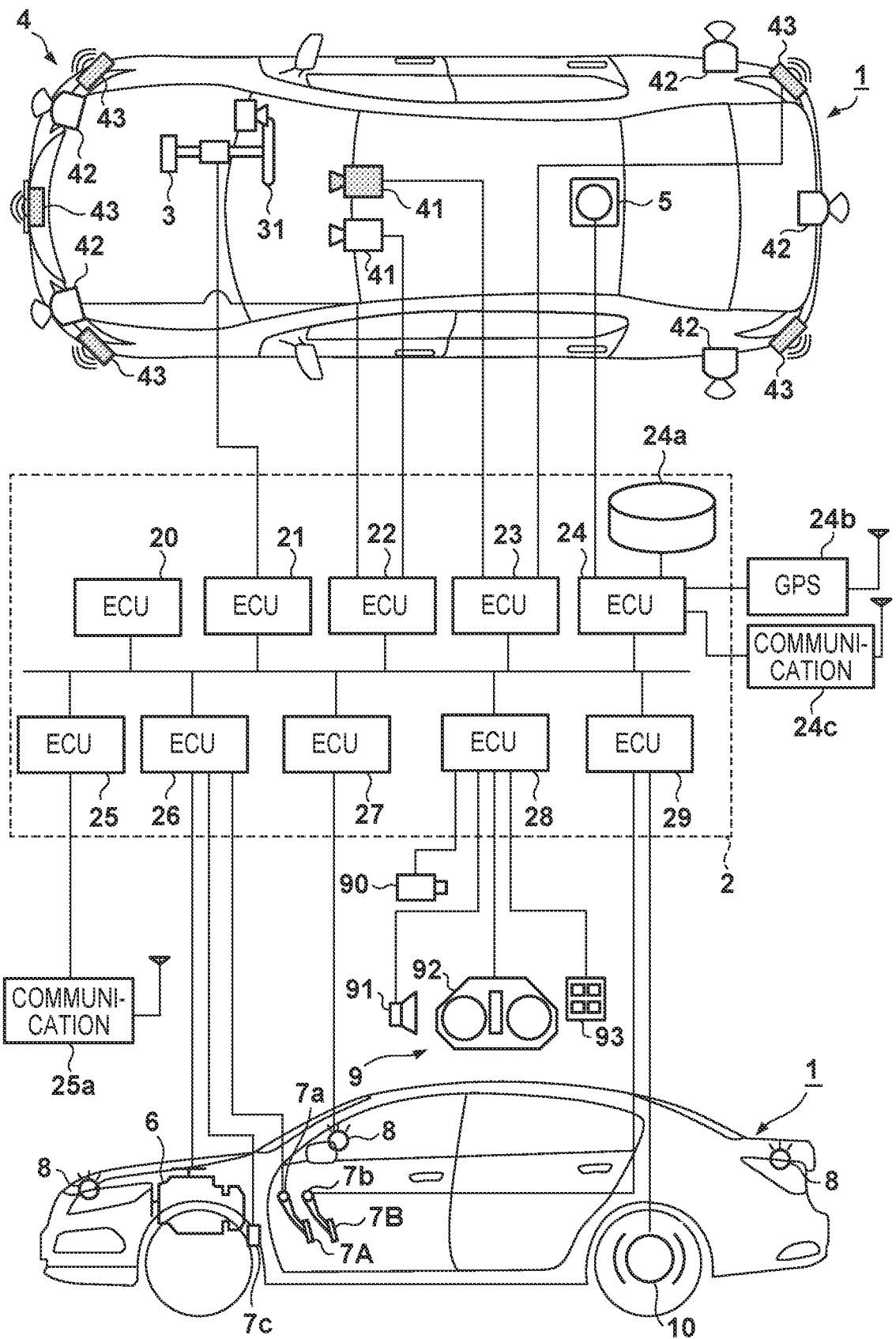
FIG. 2 is a view showing an example of the arrangement of a control block diagram configured to control a vehicle.

FIG. 2 is a view showing an example of the arrangement of a control block diagram configured to control the vehicle 1 (self-vehicle). FIG. 2 shows the schematic arrangement of the vehicle 1 in a plan view and a side view. As an example, the vehicle 1 is a sedan-type four-wheeled passenger car. For example, as shown in FIG. 2 to be described below, the function may be distributed to a plurality of ECUs included in a vehicle control apparatus 100, such as an ECU for the sensor S, an ECU for the camera, and an ECU for automated driving.

A control unit 2 shown in FIG. 2 controls each unit of the vehicle 1. The control unit 2 includes a plurality of ECUs 20 to 29 communicably connected via an internal network. Each ECU (Electronic Control Unit) includes a processor represented by a CPU (Central Processing Unit), a storage device such as a semiconductor memory, an interface to an external device, and the like. The storage device stores programs to be executed by the processor, data to be used by the processor for processing, and the like. Each ECU may include a plurality of processors, storage devices, and interfaces.

Functions and the like of the ECUs 20 to 29 will be described below. Note that the number of ECUs and their functions can appropriately be designed for the vehicle 1, and the ECUs can be more subdivided or integrated than in this embodiment.

The ECU 20 executes vehicle control associated with automated driving of the vehicle 1 (self-vehicle) according to this embodiment. In the automated driving, at least one of steering and acceleration/deceleration of the vehicle 1 is automatically controlled. Processing concerning detailed control associated with the automated driving will be described later in detail.

In traveling control of the vehicle, the ECU 20 sets the control state of automated driving and controls automated driving traveling of the vehicle based on the position of the vehicle 1 (self-vehicle) indicating the ambient situation of the vehicle, the relative position of another vehicle existing on the periphery of the vehicle 1, the information of a road on which the vehicle 1 travels, map information, and the like.

Here, the control state of automated driving is classified into a plurality of stages in accordance with the degree (the automation ratio of automated driving) of control by the control unit (for example, the ECU 20) concerning acceleration, steering, and braking of the vehicle and the degree (the level of task required of the driver) of involvement in a vehicle operation by the driver who operates the vehicle.

The ECU 21 controls an electric power steering device 3. The electric power steering device 3 includes a mechanism that steers front wheels in accordance with a driver's driving operation (steering operation) on a steering wheel 31. In addition, the electric power steering device 3 includes a motor that generates a driving force to assist the steering operation or automatically steer the front wheels, and a sensor that detects a steering angle. If the driving state of the vehicle 1 is automated driving, the ECU 21 automatically controls the electric power steering device 3 in correspondence with an instruction from the ECU 20, and controls the traveling direction of the vehicle 1.

The ECUs 22 and 23 perform control of detection units 41 to 43 configured to detect the ambient situation of the vehicle and information processing of detection results. The detection unit 41 is, for example, a camera (to be sometimes referred to as the camera 41 hereinafter) that captures the front of the vehicle 1. In this embodiment, two cameras are provided in the front portion of the roof of the vehicle 1. When images captured by the cameras 41 are analyzed (image analysis), the contour of a target or a division line (a white line or the like) of a lane on a road can be extracted.

The detection unit 42 (lidar detection unit) is, for example, a lidar (laser radar) (to be sometimes referred to as the lidar 42 hereinafter), and detects a target on the periphery of the vehicle 1 by light or measures the distance to a target. In this embodiment, a plurality of lidars 42 are provided around the vehicle. In the example shown in FIG. 2, for example, five lidars 42 are provided; one at each corner of the front portion of the vehicle 1, one at the center of the rear portion, and one on each side of the rear portion. The detection unit 43 (radar detection unit) is, for example, a millimeter wave radar (to be sometimes referred to as the radar 43 hereinafter), and detects a target on the periphery of the vehicle 1 by a radio wave or measures the distance to a target. In this embodiment, a plurality of radars 43 are provided on the periphery of the vehicle. In the example shown in FIG. 2, for example, five radars 43 are provided; one at the center of the front portion of the vehicle 1, one at each corner of the front portion, and one at each corner of the rear portion.

The ECU 22 performs control of one camera 41 and the lidars 42 and information processing of detection results. The ECU 23 performs control of the other camera 41 and the radars 43 and information processing of detection results. Since two sets of devices for detecting the ambient situation of the vehicle are provided, the reliability of detection results can be improved. In addition, since different types of detection units such as a camera, a lidar, and a radar are provided, the ambient situation of the vehicle can be multilaterally analyzed. Note that the ECUs 22 and 23 may be integrated into one ECU.

The ECU 24 performs control of a gyro sensor 5, a GPS sensor 24b, and a communication unit 24c and information processing of detection results or communication results. The gyro sensor 5 detects the rotational motion of the vehicle 1. The course of the vehicle 1 can be determined based on the detection result of the gyro sensor 5, a wheel speed, or the like. The GPS sensor 24b detects the current position of the vehicle 1. The communication unit 24c performs wireless communication with a server that provides map information or traffic information and acquires these pieces of information. The ECU 24 can access a map information database 24a formed in the storage device. The ECU 24 searches for a route from the current location to the destination. The database 24a can be arranged on the network, and the communication unit 24c can access the database 24a on the network and acquire information.

The ECU 25 includes a communication unit 25a for vehicle-to-vehicle communication. The communication unit 25a performs wireless communication with another vehicle on the periphery, and exchanges information with the vehicle.

The ECU 26 controls a power unit 6 (PU). The power unit 6 (PU) is a mechanism that outputs a driving force to rotate the driving wheels of the vehicle 1. The power unit 6 (PU) includes, for example, the power plant PT such as an engine and the transmission TM. The power unit 6 may further include a motor and a battery. The ECU 26 controls the output of the power unit 6 (PU) in correspondence with, for example, a driver's driving operation (accelerator operation or acceleration operation) detected by an operation detection sensor 7a provided on an accelerator pedal 7A, or switches the gear range of the transmission TM based on information such as a vehicle speed detected by a vehicle speed sensor 7c (S5). If the driving state of the vehicle 1 is automated driving, the ECU 26 automatically controls the power unit 6 (PU) in correspondence with an instruction from the ECU 20, and controls the acceleration/deceleration of the vehicle 1.

The ECU 27 controls lighting equipment (a headlight, a tail light, and the like) including direction indicators 8. In the example shown in FIG. 2, the direction indicators 8 are provided on the front portions, the door mirrors, and the rear portions of the vehicle 1.

The ECU 28 controls an input/output device 9. The input/output device 9 outputs information for the driver, and accepts input of information from the driver. A voice output device 91 notifies the driver of information by a voice. A display device 92 notifies the driver of information by displaying an image. The display device 92 is arranged, for example, in front of the driver's seat and constitutes an instrument panel and the like. Note that although a voice and display have been exemplified here, information may be notified by a vibration or light. In addition, information may be notified by combining a plurality of means of a voice, display, vibration, and light. Furthermore, the combination or notification form may be changed in accordance with the level (for example, the degree of urgency) of information to be notified.

An input device 93 is a switch group arranged at a position where the driver can operate it and inputs an instruction to the vehicle 1. A voice input device may also be included.

The ECU 29 controls a brake device 10 and a parking brake (not shown). The brake device 10 is, for example, a disc brake device, which is provided in each wheel of the vehicle 1 and applies a resistance to the rotation of the wheel, thereby decelerating or stopping the vehicle 1. The ECU 29 controls the actuation of the brake device 10 in correspondence with, for example, brake control pressure information output from the ECU 20 or a driver's driving operation (brake operation) detected by an operation detection sensor 7b provided on a brake pedal 7B. If brake control pressure information is included in the execution permission signal of cooperative deceleration control received by the communication unit C3, the ECU 29 controls the actuation of the brake device 10 based on the brake control pressure information.

If the driving state of the vehicle 1 is automated driving, the ECU 29 automatically controls the brake device 10 in correspondence with an instruction from the ECU 20, and controls the deceleration and stop of the vehicle 1. The brake device 10 or parking brake can also be actuated to maintain the stop state of the vehicle 1. If the transmission TM of the power unit 6 (PU) includes a parking lock mechanism, this can be actuated to maintain the stop state of the vehicle 1.

The ECU 26 that automatically controls the power unit 6 (PU) and the ECU 29 that automatically controls the brake device 10 to control the deceleration of the vehicle 1 function as a control unit (to be referred to as "control unit (26, 29)" hereinafter) configured to set a cooperative deceleration matching the deceleration of another vehicle based on deceleration information acquired by vehicle-to-vehicle communication by the communication unit C3 and perform deceleration control based on the cooperative deceleration in a case in which the vehicle 1 (self-vehicle) follows the preceding vehicle by automated driving and performs deceleration traveling on a downhill. The control unit (26, 29) corresponds to the arrangement of the CPU (C1) of the computer COM described with reference to FIG. 1.

Figure 3:
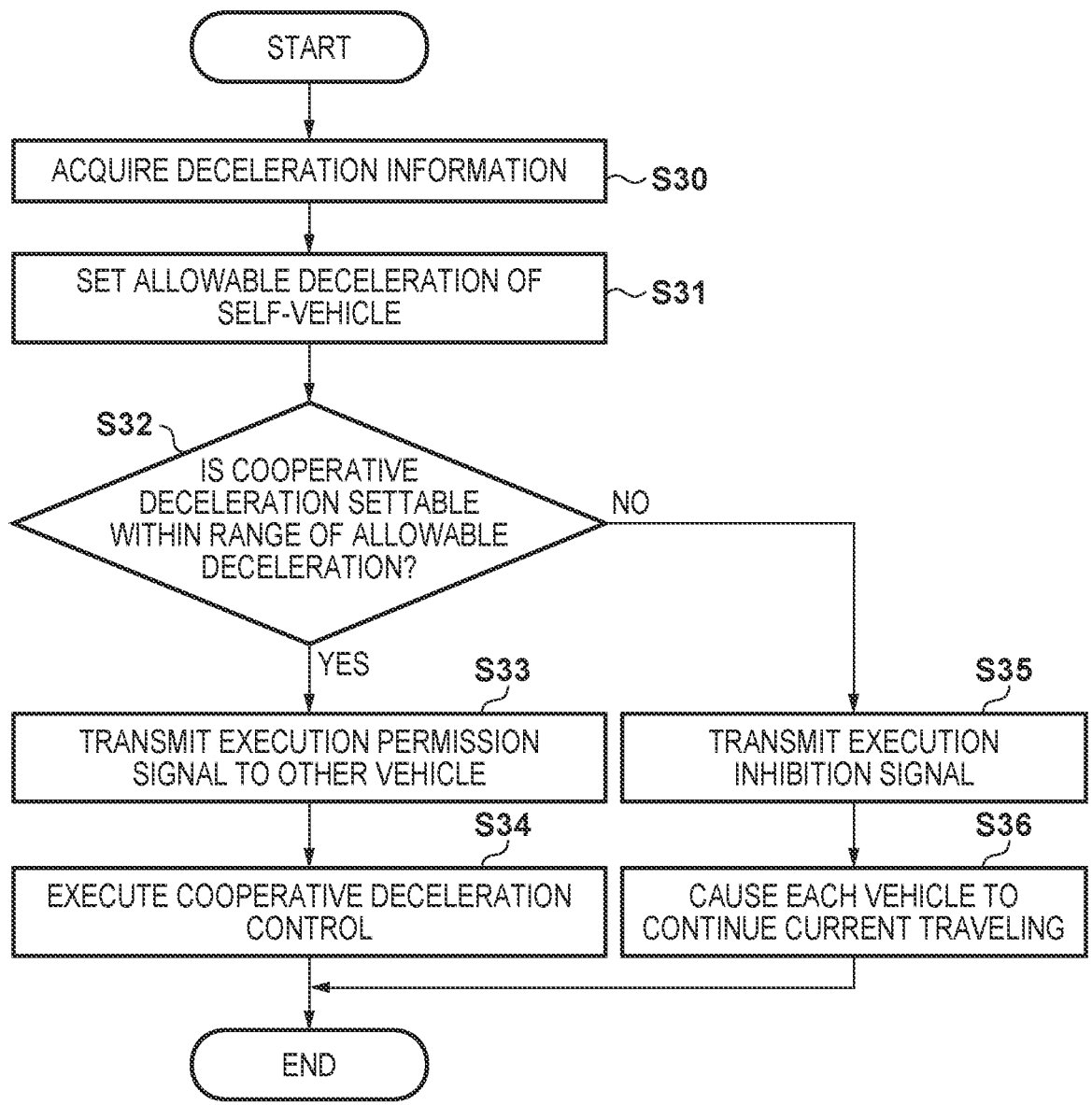
FIG. 3 is a flowchart for explaining the procedure of processing of cooperative deceleration control.
Figure 4:
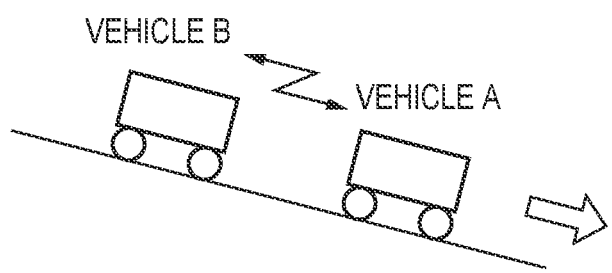
FIG. 4 is a view for exemplarily explaining cooperative deceleration control performed between two vehicles.
Figure 5:
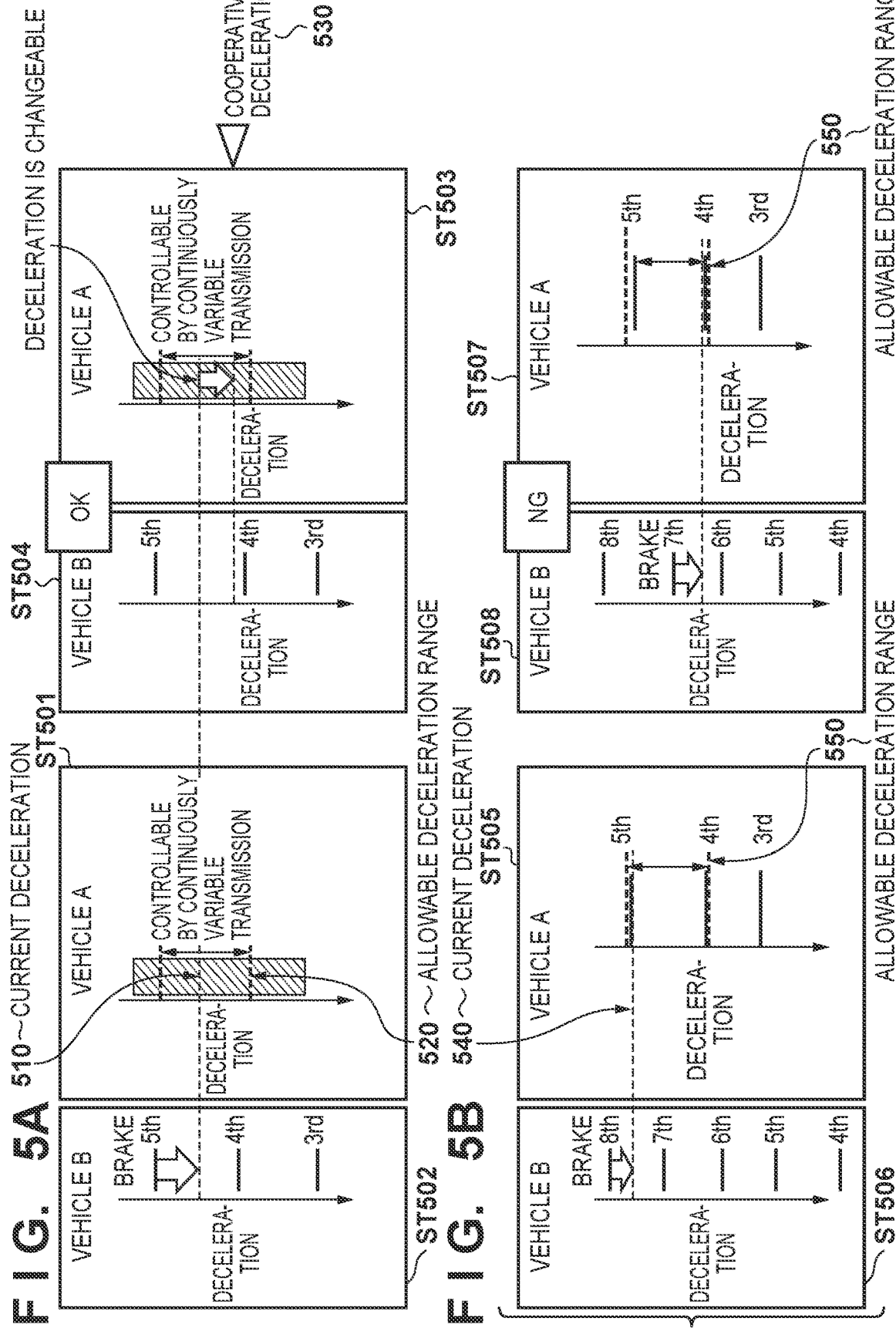
FIG. 5A is a view exemplarily showing a case in which cooperative deceleration control is possible.
FIG. 5B is a view exemplarily showing a case in which cooperative deceleration control cannot be executed.

FIG. 3 is a flowchart for explaining the procedure of processing of cooperative deceleration control by the control unit (26, 29) in the automated driving mode. FIGS. 4, 5A, and 5B are views for exemplarily explaining cooperative deceleration control performed between two vehicles, that is, between a vehicle A that is the preceding vehicle and a vehicle B that is the following vehicle.

First, in step S30, the communication unit C3 of the vehicle A that is the preceding vehicle acquires, by vehicle-to-vehicle communication, deceleration information from the vehicle B that is the following vehicle. When the communication unit C3 of the vehicle A transmits a deceleration information request signal to the vehicle B, the communication unit C3 of the vehicle B transmits deceleration information to the vehicle A, and the communication unit C3 of the vehicle A acquires the deceleration information transmitted from the vehicle B.

In step S31, the control unit (26, 29) of the vehicle A sets the allowable deceleration of the vehicle A (self-vehicle). The control unit (26, 29) sets the range of an allowable deceleration based on a change in a balanced vehicle speed caused by a deceleration change. That is, the control unit (26, 29) sets the range of an allowable deceleration that allows a vehicle speed change within a predetermined range with respect to the current deceleration.

In step S32, the control unit (26, 29) of the vehicle A compares the deceleration of the vehicle A (self-vehicle) with a deceleration included in the deceleration information acquired from the vehicle B (other vehicle). The control unit (26, 29) of the vehicle A determines whether the deceleration of the self-vehicle and that of the other vehicle match, or deceleration control (cooperative deceleration control) of matching the deceleration of the self-vehicle with the deceleration of the other vehicle can be performed by adding brake control (adding a predetermined deceleration) within the set range of the allowable deceleration.

In this step, the control unit (26, 29) determines whether cooperative deceleration control can be performed, based on the deceleration comparison result (whether the decelerations match) within the set range of the allowable deceleration.

In addition, the communication unit C3 of the vehicle A acquires the information of the brake control pressure of the vehicle B by vehicle-to-vehicle communication, and the control unit (26, 29) determines the possibility of cooperative deceleration control by determining whether the decelerations can be made to match by controlling the brake control pressure of the vehicle B to a brake control pressure equal to or less than a threshold control pressure serving as a reference. Upon determining in step S32 that cooperative deceleration control is possible (YES in step S32), the process advances to step S33.

In step S33, the communication unit C3 of the vehicle A transmits an execution permission signal to the vehicle B (other vehicle). The execution permission signal includes the information of the cooperative deceleration set in step S32.

In step S34, cooperative deceleration control is executed between the vehicles. The control unit (26, 29) of the vehicle A sets a deceleration matching between the vehicle A and the vehicle B as a cooperative deceleration, and the control unit (26, 29) performs deceleration control of the vehicle A (self-vehicle) based on the deceleration (cooperative deceleration) that matches the deceleration of the vehicle B (other vehicle). Similarly, in the vehicle B as well, deceleration control is performed based on the cooperative deceleration included in the execution permission signal.

FIG. 5A is a view exemplarily showing a case in which cooperative deceleration control is possible. This example shows that the vehicle A that is the preceding vehicle is a CVT vehicle, and the vehicle B that is the following vehicle is a 5-speed AT vehicle. The vehicle A (CVT vehicle) can control the deceleration by continuously variable transmission. The vehicle B (5-speed AT vehicle) has deceleration information corresponding to each ratio and can transmit the deceleration information to the vehicle A by vehicle-to-vehicle communication. The deceleration corresponding to each ratio can be changed by, for example, performing speed change control from a 5th-gear traveling state to the 4th or 3rd gear.

The vehicle A is traveling at a current deceleration 510, and a range 520 of an allowable deceleration is set to a range including the current deceleration 510 (ST501). The vehicle B decelerates from the 5th-gear traveling state to the same deceleration as the current deceleration 510 of the vehicle A by brake control (ST502).

Within the set range 520 of the allowable deceleration, the decelerations match between the vehicle A and the vehicle B at a deceleration corresponding to the 4th gear of the vehicle B, and this deceleration is set as a cooperative deceleration 530 (ST503). Here, the deceleration corresponding to the 3rd gear of the vehicle B is not included in the range 520 of the allowable deceleration and is therefore excluded from the comparison target of deceleration information.

As cooperative deceleration control between the vehicles, the control unit (26, 29) of the vehicle A performs deceleration control such that the current deceleration 510 matches the cooperative deceleration 530 (ST503).

The communication unit C3 of the vehicle A transmits an execution permission signal including the information of the cooperative deceleration 530 to the vehicle B. In the vehicle B, deceleration control is performed by switching the ratio to the 4th gear based on the cooperative deceleration 530 transmitted from the vehicle A (ST504).

In ST502, in the vehicle B (5-speed AT vehicle), it is necessary to perform brake control (brake on/off) in the 5th-gear traveling state or perform accelerator control in the 4th-gear traveling state to match the deceleration with the current deceleration 510 of the vehicle A (CVT vehicle). In this case, the vehicle behavior is not stable because of on/off of the brake operation, and this may cause heat generation and wear of the brake.

As shown in ST503 and ST504, when the deceleration information is communicated by vehicle-to-vehicle communication, cooperative deceleration control of changing the ratio to match the decelerations between the vehicle A (CVT vehicle) and the vehicle B (5-speed AT vehicle) can be performed. In this case, in the vehicle B, brake control or accelerator control to match the decelerations can be reduced, and this can stabilize the vehicle behavior and suppress heat generation and wear of the brake.

On the other hand, upon determining in step S32 that cooperative deceleration control cannot be executed (NO in step S32), the process advances to step S35.

In step S35, the communication unit C3 of the vehicle A transmits an execution inhibition signal to the other vehicle. In step S36, each vehicle continues the current traveling, and the processing ends.

FIG. 5B is a view exemplarily showing a case in which cooperative deceleration control cannot be executed. This example shows that the vehicle A that is the preceding vehicle is a 5-speed AT vehicle, and the vehicle B that is the following vehicle is an 8-speed AT vehicle. The vehicle A (5-speed AT vehicle) has deceleration information corresponding to each ratio, and the deceleration corresponding to each ratio can be changed by, for example, performing speed change control from a 5th-gear traveling state to the 4th or 3rd gear. The vehicle B (8-speed AT vehicle) also has deceleration information corresponding to each ratio, and can transmit the deceleration information to the vehicle A by vehicle-to-vehicle communication. The deceleration corresponding to each ratio can be changed by, for example, performing speed change control from an 8th-gear traveling state to the 7th or 6th gear.

The vehicle A is traveling at a current deceleration 540, and a range 550 of an allowable deceleration is set to a range including the current deceleration 540 (ST505). The vehicle B decelerates from the 8th-gear traveling state to the same deceleration as the current deceleration 540 of the vehicle A by brake control (ST506).

Within the set range 550 of the allowable deceleration, the decelerations are different between the vehicles, that is, between the vehicle A and the vehicle B, and a matching deceleration does not exist (ST507 and ST508). In addition, the brake control pressure in the vehicle B exceeds the threshold control pressure serving as a reference. Even when slight brake control (small brake amount) is added in the vehicle B, it is impossible to cooperate the decelerations between the vehicle A and the vehicle B (ST506 and ST508). In this case, the control unit (26, 29) of the vehicle A determines that cooperative deceleration control cannot be executed, and the communication unit C3 of the vehicle A transmits an execution inhibition signal to the other vehicle. Each vehicle continues the current traveling, and the processing ends.

(Modification 1)

Figure 6:
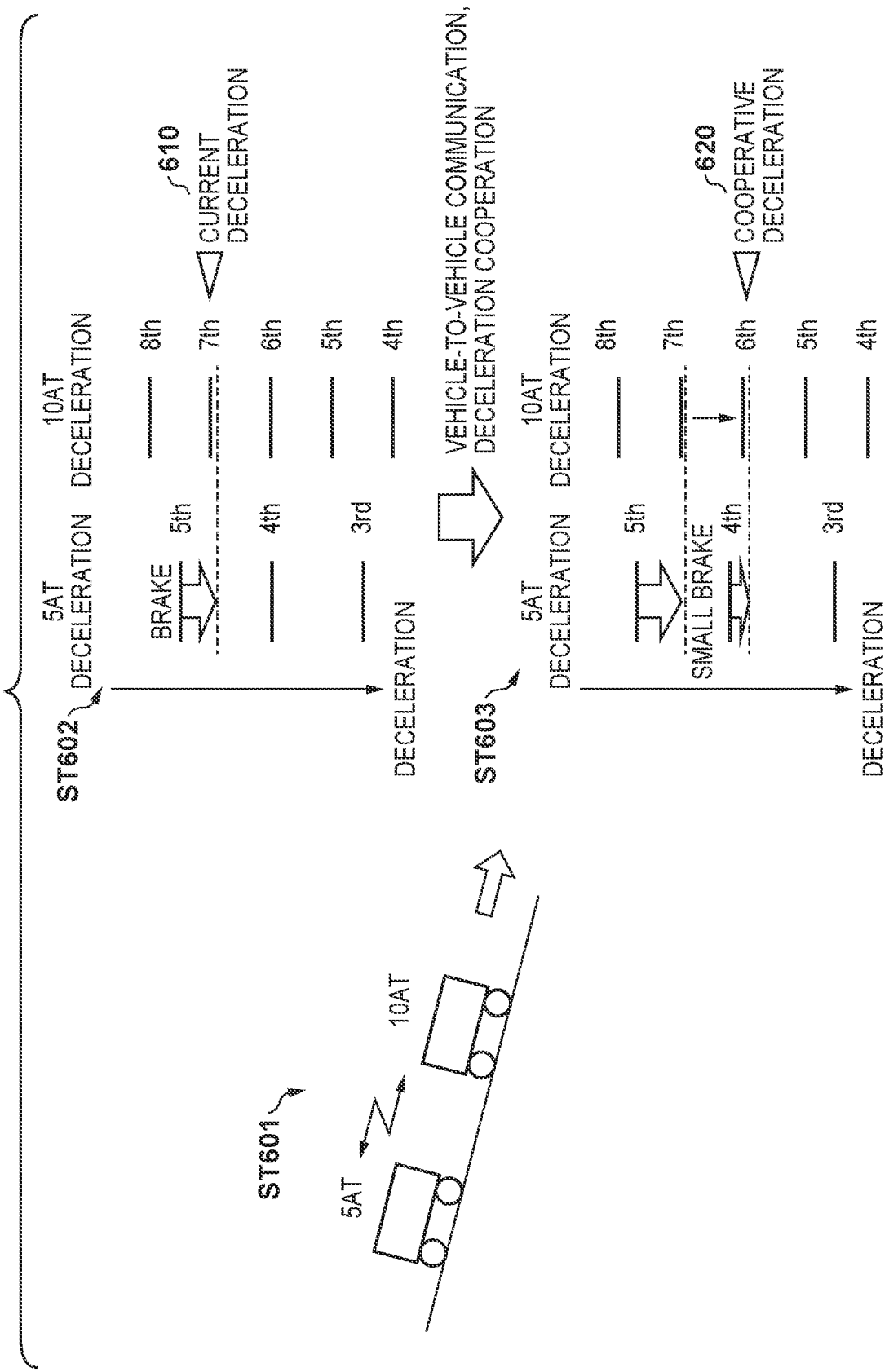
FIG. 6 is a view exemplarily showing Modification 1 of cooperative deceleration control.

FIG. 6 is a view exemplarily showing Modification 1 of cooperative deceleration control. This example shows that the vehicle A that is the preceding vehicle is a 10-speed AT vehicle, and the vehicle B that is the following vehicle is a 5-speed AT vehicle (ST601). The vehicle A (10-speed AT vehicle) has deceleration information corresponding to each ratio, and the deceleration corresponding to each ratio can be changed by, for example, performing speed change control from a 7th-gear traveling state to the 6th or 5th gear. The vehicle B (5-speed AT vehicle) also has deceleration information corresponding to each ratio, and can transmit the deceleration information to the vehicle A by vehicle-to-vehicle communication. The deceleration corresponding to each ratio can be changed by, for example, performing speed change control from a 5th-gear traveling state to the 4th or 3rd gear.

The vehicle A is traveling at a deceleration (current deceleration 610) corresponding to the 7th gear, and the vehicle B decelerates from the 5th-gear traveling state to the same deceleration as the current deceleration 610 of the vehicle A by brake control (ST602).

In the state ST602, when the vehicle B performs deceleration control in accordance with the 7th-gear deceleration set for the vehicle A, traveling is performed frequently using the brake. The vehicle behavior is not stable because of on/off of the brake operation, and this may cause heat generation and wear of the brake.

When the deceleration information including the information of the brake control pressure is communicated by vehicle-to-vehicle communication, the control unit (26, 29) of the vehicle A compares the deceleration corresponding to each ratio of the vehicle A (10-speed AT vehicle) with a deceleration included in the deceleration information acquired from the vehicle B (5-speed AT vehicle). The control unit (26, 29) of the vehicle A determines whether the decelerations match between the vehicle A and the vehicle B, or deceleration control (cooperative deceleration control) of matching the deceleration of the self-vehicle with the deceleration of the other vehicle can be performed by adding brake control (adding a predetermined deceleration) within the set range of the allowable deceleration.

In the example shown in FIG. 6, although the decelerations do not match, a deceleration (the deceleration corresponding to the 4th gear+ the deceleration of the small brake amount) obtained by changing the ratio of the vehicle B to the 4th gear and adding a predetermined deceleration by a small brake amount (brake force based on the brake control pressure equal to or less than the threshold control pressure serving as the reference) matches the deceleration obtained by changing the ratio of the vehicle A to the 6th gear. In this case, the control unit (26, 29) of the vehicle A sets a deceleration corresponding to the 6th gear of the vehicle A as a cooperative deceleration 620, and performs deceleration control such that the deceleration (current deceleration 610) corresponding to the 7th gear set before the cooperative deceleration control matches the cooperative deceleration 620 (ST603).

The communication unit C3 of the vehicle A transmits, to the vehicle B, an execution permission signal including the information of the brake control pressure used to make the small brake amount act and the information of the cooperative deceleration 620. The vehicle B performs deceleration control of switching the ratio to the 4th gear and making the small brake amount act based on the information of the brake control pressure and the cooperative deceleration 620 transmitted from the vehicle A (ST603).

As shown in ST603, when the deceleration information including the information of the brake control pressure is communicated by vehicle-to-vehicle communication, cooperative deceleration control of changing the ratio to match the decelerations between the vehicle A (10-speed AT vehicle) and the vehicle B (5-speed AT vehicle) can be performed. In this case, in the vehicle B, control of the small brake amount to match the decelerations is reduced as compared to the brake control in ST602, and this can further stabilize the vehicle behavior and further suppress heat generation and wear of the brake.

(Modification 2)

Figure 7:
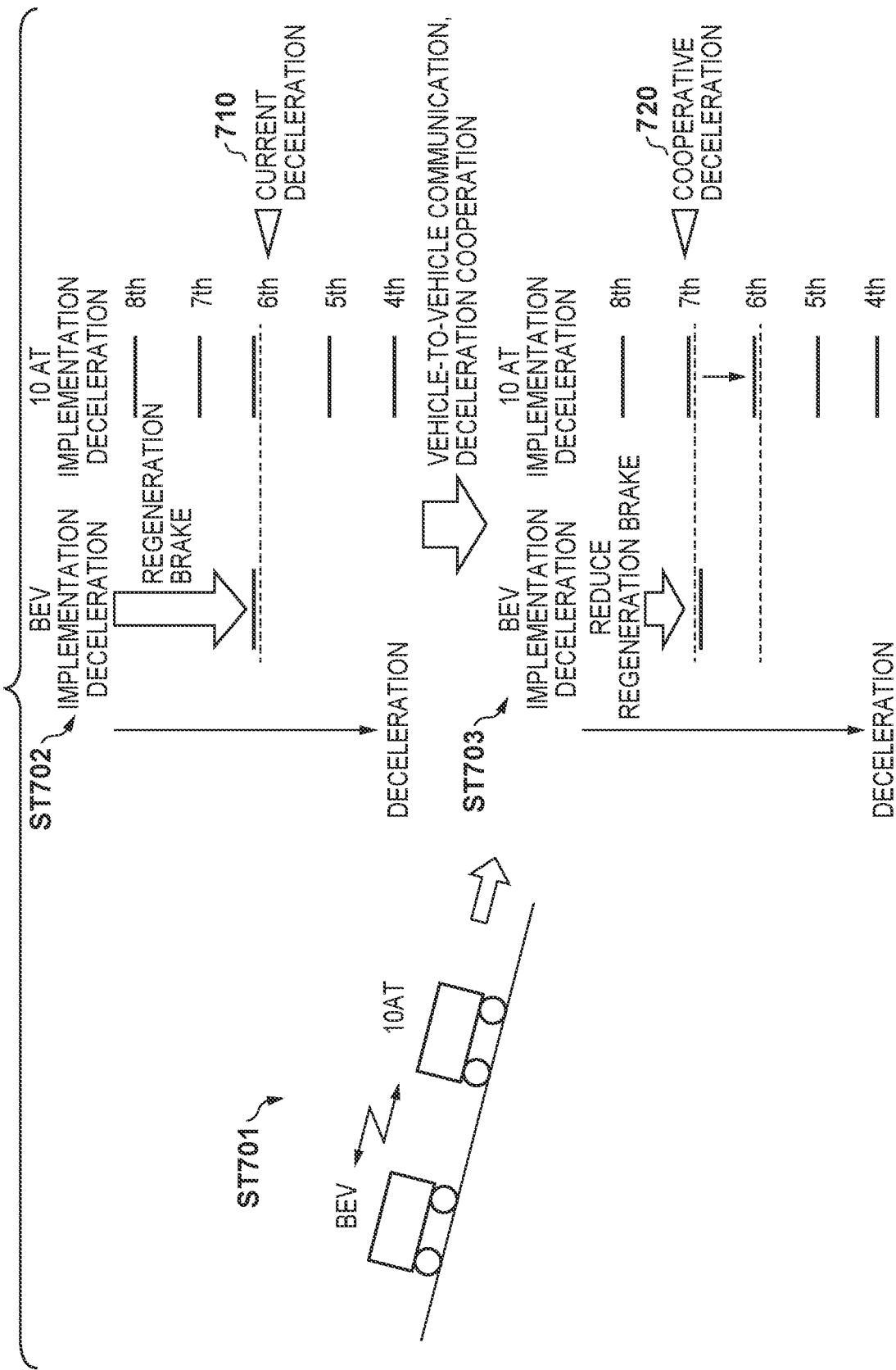
FIG. 7 is a view exemplarily showing Modification 2 of cooperative deceleration control.

FIG. 7 is a view exemplarily showing Modification 2 of cooperative deceleration control. This example shows that the vehicle A that is the preceding vehicle is a 10-speed AT vehicle, and the vehicle B that is the following vehicle is a BEV (Battery Electric Vehicle) (ST701). The vehicle B (BEV) is configured to drive the motor by power stored in the battery and charge the battery by power generation of the motor using a regeneration brake.

The vehicle A (10-speed AT vehicle) has deceleration information corresponding to each ratio, and the deceleration corresponding to each ratio can be changed by, for example, performing speed change control from a 7th-gear traveling state to the 6th or 5th gear. The vehicle B (BEV) has, as deceleration information, information representing the charging state of the battery corresponding to regeneration brake control, and can transmit the deceleration information to the vehicle A by vehicle-to-vehicle communication.

The vehicle A is traveling at a deceleration (current deceleration 710) corresponding to the 6th gear, and the vehicle B decelerates to the same deceleration as the current deceleration 710 of the vehicle A by regeneration brake control (ST702).

In the state ST702, when the vehicle B performs deceleration control in accordance with the deceleration corresponding to the 6th-gear set for the vehicle A, traveling is performed frequently using the regeneration brake. However, when the battery is almost fully charged (MAX value), the regeneration is unnecessary. Hence, in this case, traveling needs to be performed while reducing the regeneration brake to decrease the regeneration amount.

When the deceleration information is communicated by vehicle-to-vehicle communication, the control unit (26, 29) of the vehicle A compares the deceleration corresponding to each ratio of the vehicle A (10-speed AT vehicle) with a deceleration included in the deceleration information acquired from the vehicle B (BEV). The control unit (26, 29) of the vehicle A determines whether the deceleration of the vehicle A and the deceleration of the vehicle B with the reduced regeneration brake can be made to match within the set range of the allowable deceleration (for example, the range of the 7th to 6th gears).

In the example shown in FIG. 7, the deceleration of the vehicle B whose regeneration brake is reduced in accordance with the charging state of the battery matches the deceleration obtained by changing the ratio of the vehicle A to the 7th gear. In this case, the control unit (26, 29) of the vehicle A sets a deceleration corresponding to the 7th gear of the vehicle A as a cooperative deceleration 720, and performs speed change control such that the deceleration (current deceleration 710) corresponding to the 6th gear set before the cooperative deceleration control matches the cooperative deceleration 720 (deceleration corresponding to the 7th gear) (ST703).

The communication unit C3 of the vehicle A transmits, to the vehicle B, an execution permission signal including the information of the brake control pressure used to make the reduced regeneration brake act. The vehicle B performs deceleration control of reducing the regeneration brake based on the information of the brake control pressure transmitted from the vehicle A (ST703).

As shown in ST703, when the deceleration information is communicated by vehicle-to-vehicle communication, cooperative deceleration control can be performed such that the decelerations match between the vehicle A (10-speed AT vehicle) and the vehicle B (BEV). In this case, when the ratio is raised by one step in the vehicle A, the regeneration amount in the vehicle B can be reduced. This makes it possible to suppress the change of the battery charging state to the MAX value.

(Modification 3)

Figure 8:
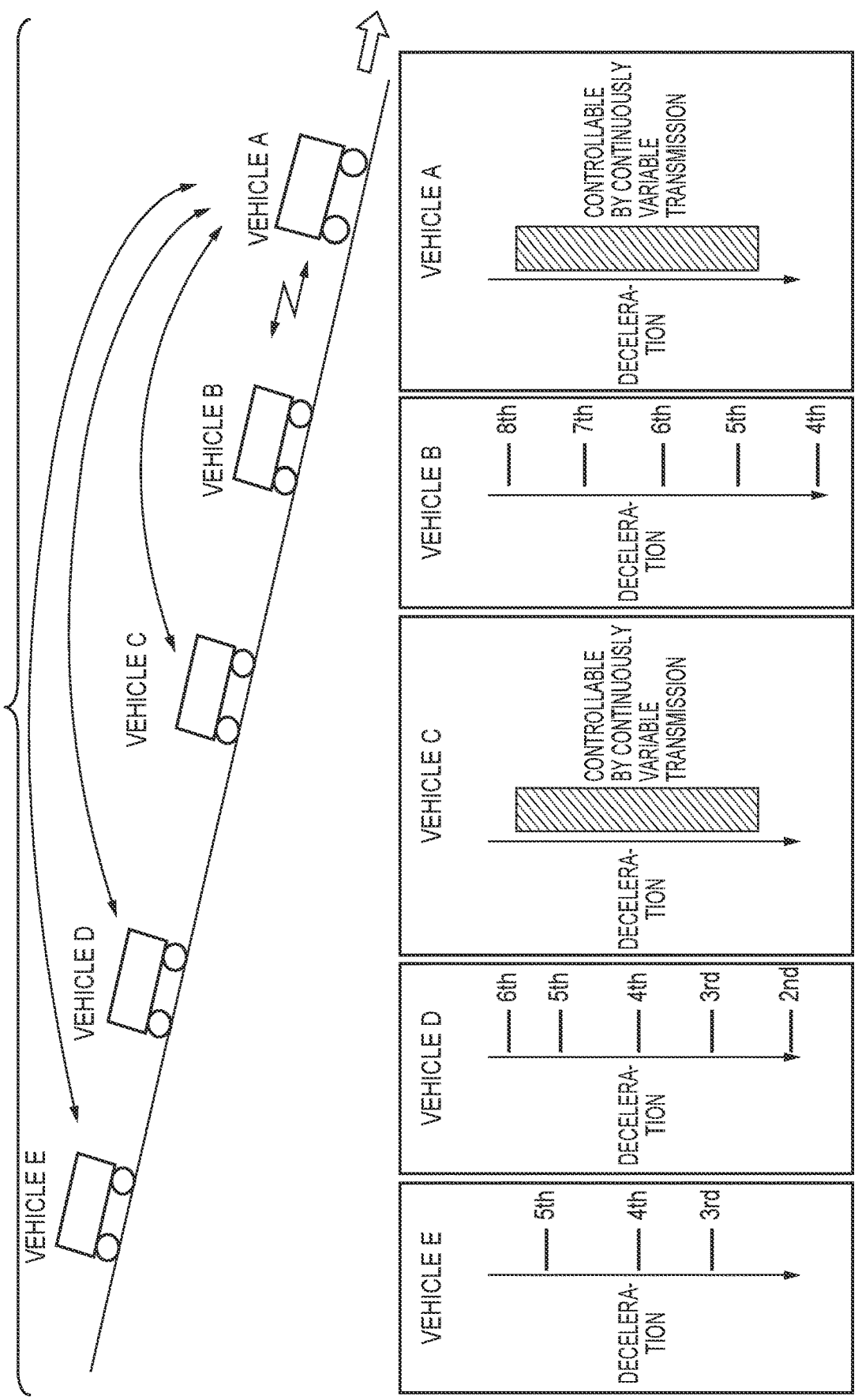
FIG. 8 is a view exemplarily showing Modification 3 of cooperative deceleration control.

FIG. 8 is a view exemplarily showing Modification 3 of cooperative deceleration control. This example shows an arrangement for performing cooperative deceleration control by performing vehicle-to-vehicle communication in a group formed by a plurality of vehicles A to E.

In this case, the first vehicle (vehicle A) in the group performs general management of cooperative deceleration control. For example, the vehicle A that is the first vehicle is a CVT vehicle, the vehicle B that is the following vehicle is an 8-speed AT vehicle, the vehicle C is a CVT vehicle, the vehicle D is a 6-speed AT vehicle, and the vehicle E is a 5-speed AT vehicle.

The vehicle A (CVT vehicle) can control the deceleration by continuously variable transmission. Each of the vehicle B (8-speed AT vehicle), the vehicle D (6-speed AT vehicle), and the vehicle E (5-speed AT vehicle) has deceleration information corresponding to each ratio and can transmit the deceleration information to the vehicle A by vehicle-to-vehicle communication. In addition, the vehicle C (CVT vehicle) can control the deceleration by continuously variable transmission, and can transmit information representing the deceleration state as deceleration information to the vehicle A.

Figure 9:
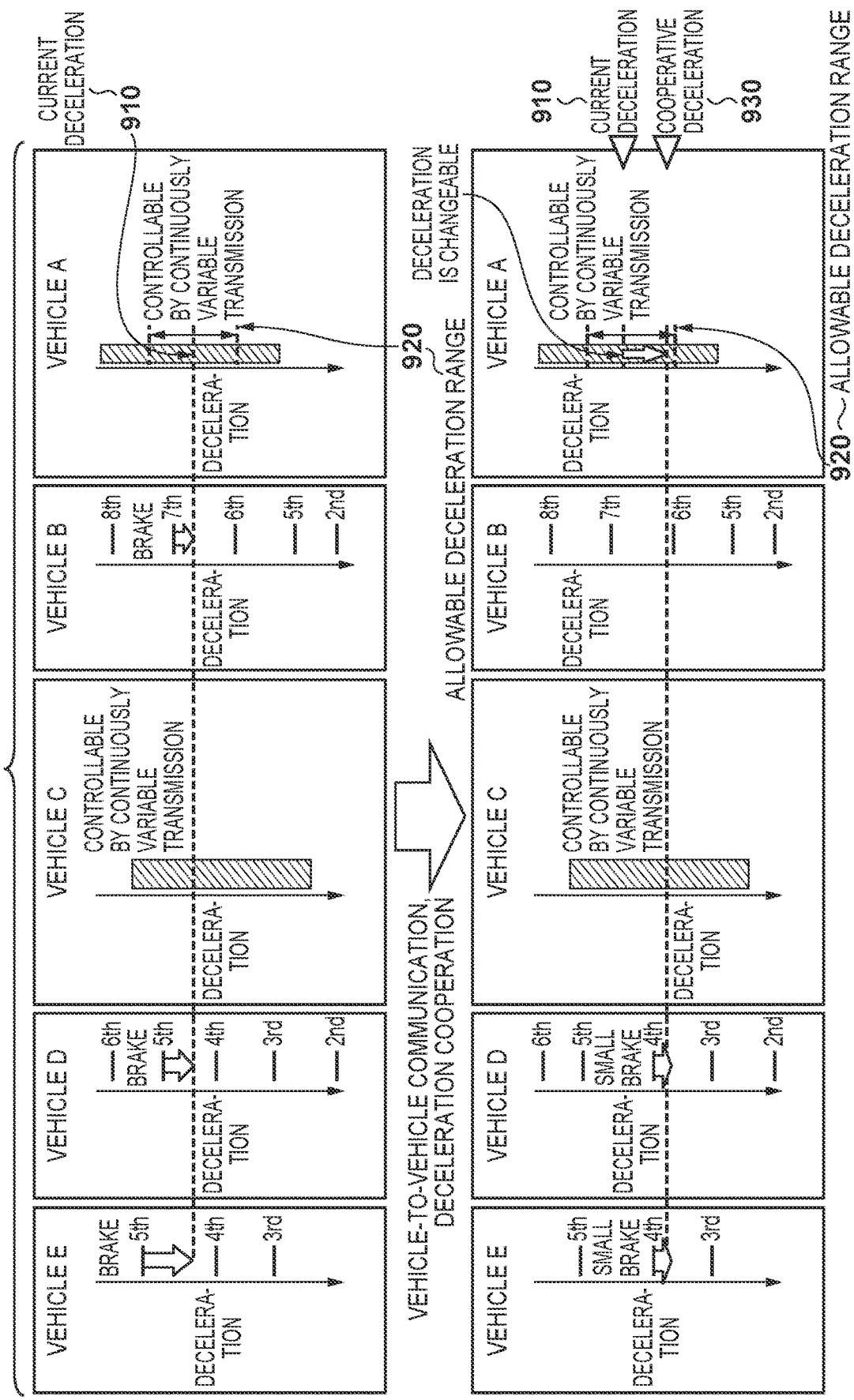
FIG. 9 is a view for explaining cooperative deceleration control executed by performing vehicle-to-vehicle communication in a group.

FIG. 9 is a view for exemplarily explaining cooperative deceleration control executed by performing vehicle-to-vehicle communication in the group. The vehicle A (CVT vehicle) is traveling at a current deceleration 910, and a range 920 of an allowable deceleration is set to a range including the current deceleration 910. The vehicle B decelerates from the 7th-gear traveling state to the same deceleration as the current deceleration 910 of the vehicle A by brake control. The vehicle C (CVT vehicle) can control the deceleration by continuously variable transmission. The vehicle C decelerates to the same deceleration as the current deceleration 910 of the vehicle A. The vehicles D and E decelerate from the 5th-gear traveling state to the same deceleration as the current deceleration 910 of the vehicle A by brake control.

The control unit (26, 29) of the vehicle A compares the deceleration of the vehicle A (self-vehicle) with a deceleration included in the deceleration information acquired from each of the vehicles B to E. The control unit (26, 29) of the vehicle A determines whether the decelerations match between the vehicle A (self-vehicle) and the vehicles B to E (other vehicles), or deceleration control (cooperative deceleration control) of matching the decelerations between the self-vehicle and the other vehicles can be performed by adding brake control (adding a predetermined deceleration) within the set range 920 of the allowable deceleration.

Within the set range 920 of the allowable deceleration, the decelerations match between the vehicle A and the vehicle B at a deceleration corresponding to the 6th gear of the vehicle B. The control unit (26, 29) of the vehicle A can change the current deceleration 910 to the deceleration corresponding to the 6th gear of the vehicle B, and this deceleration can be set as a cooperative deceleration 930.

In addition, the vehicle C can control the deceleration in accordance with the cooperative deceleration 930. Although the decelerations of the vehicles D and E do not match the cooperative deceleration 930, a deceleration (the deceleration corresponding to the 4th gear+ the deceleration of a small brake amount) obtained by changing the ratios of the vehicles D and E to the 4th gear and adding a predetermined deceleration by the small brake amount (brake control to the threshold control pressure serving as the reference or less) matches the cooperative deceleration 930. Hence, in the vehicles A to E, the decelerations of the vehicles can be made to match based on the cooperative deceleration 930, and the control unit (26, 29) of the vehicle A determines the cooperative deceleration 930. Note that if there exist a plurality of candidates of the cooperative deceleration 930 that satisfies the deceleration or the deceleration of the small brake amount, which can be controlled by each vehicle in the group, the control unit (26, 29) selects a deceleration at which the sum (total brake amount) of the brake control amounts of all vehicles is minimized.

FIG. 10 is a flowchart for explaining the procedure of selection processing in a case in which a plurality of candidates of the cooperative deceleration exist. FIGS. 11A and 11B are views for explaining deceleration selection processing in a case in which a plurality of candidates of the cooperative deceleration 930 exist.

In step S100, the control unit (26, 29) of the vehicle A acquires the current deceleration of the vehicle A. In step S101, the control unit (26, 29) sets, for the current deceleration, the range of an allowable deceleration that allows a vehicle speed change within a predetermined range.

In step S102, the control unit (26, 29) calculates a deceleration with which the deceleration of each vehicle becomes equal to or less than the current deceleration within the range of the allowable deceleration. Then, in step S103, the control unit (26, 29) acquires a necessary brake amount of each vehicle in correspondence with each deceleration of the vehicle A. The communication unit C3 of the vehicle A acquires the information of the brake control pressure of each vehicle by vehicle-to-vehicle communication. The control unit (26, 29) acquires the necessary brake amounts of the other vehicles, which are needed to decelerate the vehicles in accordance with each deceleration of the vehicle A, based on the information of the brake control pressure.

In step S104, the control unit (26, 29) acquires the total brake amount of all the vehicles (in the case of FIGS. 11A and 11B, the vehicles B, D, and E) at each deceleration of the vehicle A. In step S105, the control unit (26, 29) selects, as the cooperative deceleration, a deceleration at which the total brake amount is minimized in the total brake amounts of all vehicles at each deceleration.

FIG. 11A is a view showing the distribution of the necessary brake amounts of the vehicles at each deceleration. Here, the vehicle A is a CVT vehicle that performs general management of cooperative deceleration control. The vehicle C is also a CVT vehicle and can control the deceleration by continuously variable transmission. The vehicle B (8-speed AT vehicle), the vehicle D (6-speed AT vehicle), and the vehicle E (5-speed AT vehicle) need brake control. In FIG. 11A, the necessary brake amounts are acquired for the vehicles B, D, and E.

In FIG. 11A, at a current deceleration 1101, the necessary brake amount of each vehicle, which is needed to match the deceleration with the current deceleration of the vehicle A, is shown. When a deceleration at which the deceleration of each vehicle becomes equal to or less than the current deceleration 1101 is calculated within a range 1102 of the allowable deceleration, two decelerations 1103 and 1104 shown in FIG. 11A are obtained. The two decelerations 1103 and 1104 are the candidates of the cooperative deceleration.

FIG. 11B is a view showing the distribution of the total brake amounts of all vehicles (vehicles B, D, and E) at each deceleration. Of the decelerations 1103 and 1104, the total brake amount is minimized at the deceleration 1103, and the deceleration 1103 is set as the cooperative deceleration. The communication unit C3 of the vehicle A transmits the information of the brake amounts of the other vehicles necessary for the deceleration 1103 (cooperative deceleration) and the information of the deceleration 1103 (cooperative deceleration) to the vehicles together with the execution permission signal.

The control unit (26, 29) of the vehicle A performs deceleration control to match the deceleration with the cooperative deceleration based on the deceleration 1103 (cooperative deceleration) selected based on the total brake amount. In the vehicles B to E, deceleration control is performed based on the information of the deceleration 1103

(cooperative deceleration) transmitted from the vehicle A. Additionally, in the vehicles B, D, and E, deceleration control is performed by controlling the activation of the brake device based on the brake control pressure used to obtain the brake amount necessary for the cooperative deceleration.

This makes it possible to perform cooperative deceleration control at a deceleration at which the total brake amount is minimized in all vehicles of a group in a case in which the cooperative deceleration control is performed by vehicle-to-vehicle communication in the group formed by the plurality of vehicles. Accordingly, even in a case in which the deceleration of the brake is necessary in cooperative deceleration control concerning all the vehicles of the group, it is possible to further stabilize the vehicle behavior and further suppress heat generation and wear of the brake by minimizing the ratio of the brake amount.

Additionally, a program having one or more functions described in each embodiment is supplied to a system or an apparatus via a network or a storage medium, and one or more processors in the computer of the system or the apparatus can read out and execute the program. The present invention can also be implemented by this form.

<Summary of Embodiment>

Arrangement 1. A vehicle control apparatus according to the above-described embodiment is a vehicle control apparatus (for example, computer COM) for controlling a vehicle that is performing automated driving traveling, comprising:

a communication unit (for example, communication unit C3) configured to acquire deceleration information of another vehicle by communication with the other vehicle;

a setting unit (for example, setting unit C11, ECU 26, ECU 29) configured to set, for a deceleration of the vehicle, a range of an allowable deceleration that allows a vehicle speed change within a predetermined range;

a determination unit (for example, determination unit C12, ECU 26, ECU 29) configured to compare the deceleration of the vehicle with a deceleration included in the deceleration information and determine whether deceleration control of matching the deceleration of the vehicle with the deceleration of the other vehicle can be performed within the range of the allowable deceleration; and a control unit (for example, control unit C13, ECU 26, ECU 29) configured to perform the deceleration control of the vehicle based on a determination result of the determination unit (determination unit C12, ECU 26, ECU 29), wherein the control unit (control unit C13, ECU 26, ECU 29) sets a deceleration matching between the vehicle and the other vehicle as a cooperative deceleration and performs the deceleration control of the vehicle based on the cooperative deceleration, and the communication unit (communication unit C3) transmits a signal including information of the cooperative deceleration to the other vehicle.

Arrangement 2. In the vehicle control apparatus (COM) according to the above-described embodiment, the communication unit (communication unit C3) acquires information of a brake control pressure of the other vehicle by communication with the other vehicle, and the determination unit (determination unit C12, ECU 26, ECU 29) determines whether the deceleration of the vehicle can be made to match by adding a deceleration of a brake device based on the brake control pressure not more than a threshold control pressure in a case in which the decelerations do not match between the vehicle and the other vehicle.

Arrangement 3. In the vehicle control apparatus (COM) according to the above-described embodiment, in a case in which the deceleration of the vehicle can be made to match by adding the deceleration of the brake device, the communication unit (communication unit C3) transmits a signal including the information of the brake control pressure and the information of the cooperative deceleration to the other vehicle.

Arrangement 4. In the vehicle control apparatus (COM) according to the above-described embodiment, in a case in which the other vehicle includes a stepped transmission, the communication unit (communication unit C3) acquires a deceleration corresponding to each ratio of the stepped transmission as the deceleration information.

Arrangement 5. In the vehicle control apparatus (COM) according to the above-described embodiment, in a case in which the other vehicle is an electric vehicle configured to drive a motor by power stored in a battery and charge the battery by power generation of the motor using a regeneration brake, the communication unit (communication unit C3) acquires information representing a charging state of the battery corresponding to regeneration brake control as the deceleration information.

Arrangement 6. In the vehicle control apparatus (COM) according to the above-described embodiment, the determination unit (determination unit C12, ECU 26, ECU 29) determines, based on the deceleration information, whether the deceleration of the vehicle and the deceleration of the electric vehicle with a reduced regeneration brake can be made to match within the set range of the allowable deceleration.

Arrangement 7. In the vehicle control apparatus (COM) according to the above-described embodiment, in a case in which a plurality of other vehicles are included as following vehicles of the vehicle, the communication unit (communication unit C3) acquires information of a brake control pressure by communication with the plurality of other vehicles, and the control unit (control unit C13, ECU 26, ECU 29) acquires, for each deceleration of the vehicle, a total brake amount obtaining by totaling necessary brake amounts of the other vehicles, which are needed to decelerate the vehicles in accordance with each deceleration of the vehicle, based on the information of the brake control pressure, and selects a deceleration at which the total brake amount is minimized as the cooperative deceleration.

Arrangement 8. In the vehicle control apparatus (COM) according to the above-described embodiment, the control unit (control unit C13, ECU 26, ECU 29) performs the deceleration control of the vehicle based on the cooperative deceleration selected based on the total brake amount, and the communication unit (communication unit C3) transmits a signal including the information of the brake control pressure used to obtain a brake amount needed for the cooperative deceleration and the information of the cooperative deceleration to the other vehicles.

Arrangement 9. In the vehicle control apparatus (COM) according to the above-described embodiment, the communication unit (communication unit C3) transmits a request signal of the deceleration information to the other vehicle that is a following vehicle of the vehicle, and acquires the deceleration information transmitted from the other vehicle as a response to the request signal.

Arrangement 10. The vehicle control apparatus (COM) according to the above-described embodiment further comprises a storage unit configured to store the deceleration information, and the determination unit (determination unit C12, ECU 26, ECU 29) compares a deceleration included in the deceleration information in the storage unit with the deceleration included in the deceleration information acquired from the other vehicle and determines whether the deceleration control of matching the deceleration of the vehicle with the deceleration of the other vehicle can be performed within the range of the allowable deceleration.

Arrangement 11. In the vehicle control apparatus (COM) according to the above-described embodiment, in a case in which the communication unit (communication unit C3) receives a signal including information of the cooperative deceleration transmitted from the other vehicle, the control unit (control unit C13, ECU 26, ECU 29) performs the deceleration control of the vehicle based on the cooperative deceleration received by the communication unit (communication unit C3).

Arrangement 12. In the vehicle control apparatus (COM) according to the above-described embodiment, in a case in which the communication unit (communication unit C3) receives a signal including information of the brake control pressure and information of the cooperative deceleration transmitted from the other vehicle, the control unit (control unit C13, ECU 26, ECU 29) controls actuation of a brake device based on the brake control pressure received by the communication unit and performs the deceleration control of the vehicle based on the cooperative deceleration.

Arrangement 13. A vehicle control method according to the above-described embodiment is a vehicle control method of controlling a vehicle that is performing automated driving traveling, comprising:

acquiring, by a communication unit, deceleration information of another vehicle by communication with the other vehicle (for example, step S30);

setting, by a setting unit, a range of an allowable deceleration that allows a vehicle speed change within a predetermined range for a deceleration of the vehicle (for example, step S31);

comparing, by a determination unit, the deceleration of the vehicle with a deceleration included in the deceleration information and determining whether deceleration control of matching the deceleration of the vehicle with the deceleration of the other vehicle can be performed within the range of the allowable deceleration (for example, step S32); and performing, by a control unit, the deceleration control of the vehicle based on a determination result of the determination unit (for example, step S33, S34), wherein in the performing the deceleration control (step S33, S34), the control unit sets a deceleration matching between the vehicle and the other vehicle as a cooperative deceleration, and performs the deceleration control of the vehicle based on the cooperative deceleration, and the communication unit transmits a signal including information of the cooperative deceleration to the other vehicle.

According to the vehicle control apparatus of any one of Arrangements 1 to 12 or the vehicle control method of Arrangement 13, it is possible to set the cooperative deceleration matching the deceleration of the other vehicle based on the deceleration information acquired by communication with the other vehicle and perform deceleration control based on the cooperative deceleration.

According to the vehicle control apparatus of any one of Arrangements 2, 3, 7, and 8, it is possible to reduce brake control for matching the decelerations and stabilize the vehicle behavior and suppress heat generation and wear of the brake.

According to the vehicle control apparatus of Arrangement 5 or 6, it is possible to perform deceleration control of reducing the regeneration brake in accordance with the charging state of the battery.

According to the vehicle control apparatus of Arrangement 9 or 10, in a case in which the self-vehicle is the preceding vehicle, deceleration information is acquired from the other vehicle that is the following vehicle, thereby performing general management of cooperative deceleration control.

According to the vehicle control apparatus of Arrangement 11 or 12, in a case in which the self-vehicle is the following vehicle, deceleration control is performed based on information transmitted from the preceding vehicle, thereby performing cooperative deceleration control of matching the deceleration of the self-vehicle with the deceleration of the preceding vehicle.

What is claimed is:

1. A vehicle control apparatus for controlling a vehicle that is performing automated driving traveling, comprising:
   a communication unit configured to acquire deceleration information of another vehicle by communication with the other vehicle;
   a setting unit configured to set, for a deceleration of the vehicle, a range of an allowable deceleration that allows a vehicle speed change within a predetermined range;
   a determination unit configured to compare the deceleration of the vehicle with a deceleration included in the deceleration information and determine whether deceleration control of matching the deceleration of the vehicle with the deceleration of the other vehicle can be performed within the range of the allowable deceleration; and
   a control unit configured to perform the deceleration control of the vehicle based on a determination result of the determination unit,
   wherein the control unit sets a deceleration matching between the vehicle and the other vehicle as a cooperative deceleration and performs the deceleration control of the vehicle based on the cooperative deceleration, and
   the communication unit transmits a signal including information of the cooperative deceleration to the other vehicle.

2. The apparatus according to claim 1, wherein the communication unit acquires information of a brake control pressure of the other vehicle by communication with the other vehicle, and
   the determination unit determines whether the deceleration of the vehicle can be made to match by adding a deceleration of a brake device based on the brake control pressure not more than a threshold control pressure in a case in which the decelerations do not match between the vehicle and the other vehicle.

3. The apparatus according to claim 2, wherein in a case in which the deceleration of the vehicle can be made to match by adding the deceleration of the brake device, the communication unit transmits a signal including the information of the brake control pressure and the information of the cooperative deceleration to the other vehicle.

4. The apparatus according to claim 1, wherein in a case in which the other vehicle includes a stepped transmission, the communication unit acquires a deceleration corresponding to each ratio of the stepped transmission as the deceleration information.

5. The apparatus according to claim 1, wherein in a case in which the other vehicle is an electric vehicle configured to drive a motor by power stored in a battery and charge the battery by power generation of the motor using a regeneration brake, the communication unit acquires information representing a charging state of the battery corresponding to regeneration brake control as the deceleration information.

6. The apparatus according to claim 5, wherein the determination unit determines, based on the deceleration information, whether the deceleration of the vehicle and the deceleration of the electric vehicle with a reduced regeneration brake can be made to match within the set range of the allowable deceleration.

7. The apparatus according to claim 1, wherein in a case in which a plurality of other vehicles are included as following vehicles of the vehicle, the communication unit acquires information of a brake control pressure by communication with the plurality of other vehicles, and the control unit acquires, for each deceleration of the vehicle, a total brake amount obtaining by totaling necessary brake amounts of the other vehicles, which are needed to decelerate the vehicles in accordance with each deceleration of the vehicle, based on the information of the brake control pressure, and selects a deceleration at which the total brake amount is minimized as the cooperative deceleration.

8. The apparatus according to claim 7, wherein the control unit performs the deceleration control of the vehicle based on the cooperative deceleration selected based on the total brake amount, and the communication unit transmits a signal including the information of the brake control pressure used to obtain a brake amount needed for the cooperative deceleration and the information of the cooperative deceleration to the other vehicles.

9. The apparatus according to claim 1, wherein the communication unit transmits a request signal of the deceleration information to the other vehicle that is a following vehicle of the vehicle, and acquires the deceleration information transmitted from the other vehicle as a response to the request signal.

10. The apparatus according to claim 1, further comprising:

a storage unit configured to store the deceleration information, wherein the determination unit compares a deceleration included in the deceleration information in the storage unit with the deceleration included in the deceleration information acquired from the other vehicle and determines whether the deceleration control of matching the deceleration of the vehicle with the deceleration of the other vehicle can be performed within the range of the allowable deceleration.

11. The apparatus according to claim 1, wherein in a case in which the communication unit receives a signal including information of the cooperative deceleration transmitted from the other vehicle, the control unit performs the deceleration control of the vehicle based on the cooperative deceleration received by the communication unit.

12. The apparatus according to claim 7, wherein in a case in which the communication unit receives a signal including information of the brake control pressure and information of the cooperative deceleration transmitted from the other vehicle, the control unit controls actuation of a brake device based on the brake control pressure received by the communication unit and performs the deceleration control of the vehicle based on the cooperative deceleration.

13. A vehicle control method of controlling a vehicle that is performing automated driving traveling, comprising:

acquiring, by a communication unit, deceleration information of another vehicle by communication with the other vehicle;

setting, by a setting unit, a range of an allowable deceleration that allows a vehicle speed change within a predetermined range for a deceleration of the vehicle;

comparing, by a determination unit, the deceleration of the vehicle with a deceleration included in the deceleration information and determining whether deceleration control of matching the deceleration of the vehicle with the deceleration of the other vehicle can be performed within the range of the allowable deceleration; and performing, by a control unit, the deceleration control of the vehicle based on a determination result of the determination unit, wherein in the performing the deceleration control, a deceleration matching between the vehicle and the other vehicle is set as a cooperative deceleration, and the deceleration control of the vehicle is performed based on the cooperative deceleration, and in the acquiring, a signal including information of the cooperative deceleration is transmitted to the other vehicle.

* * * * *